(12) United States Patent
Kawanishi

(10) Patent No.: US 7,330,921 B2
(45) Date of Patent: Feb. 12, 2008

(54) COMMUNICATION CONTROL CIRCUIT AND COMMUNICATION CONTROL METHOD

(75) Inventor: Suehiro Kawanishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/329,096

(22) Filed: Jan. 11, 2006

(65) Prior Publication Data

US 2006/0123163 A1    Jun. 8, 2006

Related U.S. Application Data

(63) Continuation of application No. PCT/JP03/11796, filed on Sep. 16, 2003.

(51) Int. Cl.
*G06F 13/42* (2006.01)
*G06F 13/20* (2006.01)
*G06F 13/00* (2006.01)

(52) U.S. Cl. .................. 710/106; 710/313; 711/106

(58) Field of Classification Search ............... 710/106, 710/313; 711/106
See application file for complete search history.

(56) References Cited

U.S. PATENT DOCUMENTS

| | | | | |
|---|---|---|---|---|
| 4,112,513 A | * | 9/1978 | Elsner | 365/222 |
| 4,691,303 A | * | 9/1987 | Churchward et al. | 365/222 |
| 5,265,231 A | * | 11/1993 | Nuwayser | 711/106 |
| 5,818,948 A | * | 10/1998 | Gulick | 381/77 |
| 5,890,015 A | * | 3/1999 | Garney et al. | 710/62 |
| 7,028,133 B1 | * | 4/2006 | Jackson | 710/313 |
| 2003/0110154 A1 | * | 6/2003 | Ishihara et al. | 707/1 |

FOREIGN PATENT DOCUMENTS

| | | |
|---|---|---|
| JP | 09-172436 | 6/1997 |
| JP | 2000-244539 | 9/2000 |
| JP | 2000-293322 | 10/2000 |
| JP | 2003-008579 | 1/2003 |

* cited by examiner

*Primary Examiner*—Mark H. Rinehart
*Assistant Examiner*—Jeremy S Cerullo
(74) *Attorney, Agent, or Firm*—Arent Fox LLP

(57) ABSTRACT

A communication control circuit that performs the process of receiving a response to send data in synchronous transfer mode within a certain period of time without using an external control circuit. A permissible time calculation section calculates permissible time for receiving response data corresponding to send data sent to each of communication nodes connected to a serial bus from data length of the send data, data length of the response data, and a number of the communication nodes to which the send data is sent on the basis of communication cycles specified in the synchronous transfer mode. A response time management section determines whether the response data received as a response to the send data sent via the serial bus is received within the permissible time calculated by the permissible time calculation section. As a result, time taken to receive the response data corresponding to the send data is guaranteed.

6 Claims, 11 Drawing Sheets

COMMUNICATION CONTROL CIRCUIT AND COMMUNICATION CONTROL METHOD

This application is a continuing application, filed under 35 U.S.C. §111(a), of International Application PCT/JP2003/011796, filed on Sep. 16, 2003.

BACKGROUND OF THE INVENTION (1) Field of the Invention

This invention relates to a communication control circuit for sending data to or receiving data from one or more communication nodes connected via a bus in synchronous transfer mode based on unique communication cycles and a communication control method used in such a communication control circuit and, more particularly, to a communication control circuit and communication control method capable of guaranteeing a real-time response to send data.

(2) Description of the Related Art

There has been an increase in the number of devices to be controlled or the amount of data to be transferred in recent factory automation (FA) systems, so high-speed communication lines are required for transferring control commands and data. In addition, to exercise integrated control over units, for example, manufactured by various makers, general-purpose communication lines must be used. On the other hand, the Institute of Electrical and Electronic Engineers (IEEE) 1394 interface is known as a serial interface standard by which a comparatively large amount of data can be transferred (at a rate of 100 to 400 Mbps, for example) mainly between household electronic devices. The use of the IEEE 1394 interface in FA systems is being studied.

In the IEEE 1394 interface, isochronous transfer mode and asynchronous transfer mode can be used as operation modes of data transfer. In the isochronous transfer mode, sending in an isochronous cycle is guaranteed to all of communication nodes that make send requests. The main purpose of the isochronous transfer mode is to transfer image data or voice data in one direction in real time.

The asynchronous transfer mode is an operation mode in which a certain bandwidth is not guaranteed. In the asynchronous transfer mode, data is transferred to a specific node and the node that receives the data must return a response. Therefore, usually control commands and the like are transferred in the asynchronous transfer mode. However, when, for example, a control command for starting a task is sent to a device to be controlled in an FA system, the isochronous transfer mode must be used because real-time control must be guaranteed.

A cyclic data communication system in which in order to send target data, in an asynchronous communication phase a communication node assigned as an ordinary station makes a send request and gets a chance to send in response to a cyclic trigger packet indicative of the beginning of a communication cycle periodically sent from a communication node assigned as a management station in an isochronous communication phase has conventionally been proposed as a related technique (see, for example, Japanese Unexamined Patent Publication No. 2003-8579 (paragraphs [0109]-[0117] and FIG. 9)). In this system, timing with which data is sent is obtained in the isochronous communication phase and the data is transferred in the asynchronous communication phase. This enables control over a high-speed transfer and a high-speed response.

As stated above, real-time data transfer is not guaranteed in asynchronous transfer mode. Accordingly, for example, a control command for starting a task must be transferred in isochronous transfer mode. However, isochronous transfer mode does not entail an obligation to return a response to receive data. To send a response or check that the response is received, control units, such as micro processing units (MPUs), must be located outside communication control large scale integrated circuits (LSIs) at the sending and receiving ends of a control command and communication must be controlled on the basis of processes performed by these external control units. This leads to an increase in the manufacturing costs or installation area of communication systems. In addition, overhead is incurred at the time of transfer by the external control units. For example, in a node at the receiving end, the external control unit must detect the occurrence of a receiving interruption, set response data, or issue a command to begin the transfer of the response data. Such overhead makes it difficult to guarantee real-time data transfer.

SUMMARY OF THE INVENTION

The present invention was made under the background circumstances described above. An object of the present invention is to provide a communication control circuit capable of performing the process of receiving a response to send data in a certain period of time without an external control circuit by using synchronous transfer mode.

Another object of the present invention is to provide a communication control method capable of performing the process of receiving a response to send data in a certain period of time without an external control circuit by using synchronous transfer mode.

In order to achieve the above first object, a communication control circuit for controlling sending data to or receiving data from one or more communication nodes connected via a serial bus in synchronous transfer mode based on unique communication cycles is provided. This communication control circuit comprises a permissible time calculation section for calculating permissible time for receiving response data corresponding to send data sent to each of the communication nodes from data length of the send data, data length of the response data, and a number of the communication nodes to which the send data is sent on the basis of the communication cycles; and a response time management section for determining whether the response data received as a response to the send data sent via the serial bus is received within the permissible time calculated by the permissible time calculation section.

Moreover, in order to achieve the above first object, a communication control circuit for controlling sending data to or receiving data from one or more communication nodes connected via a serial bus in synchronous transfer mode based on a unique communication cycle is provided. This communication control circuit comprises a response data holding section for holding in advance response data corresponding to send data sent from a predetermined communication node on the serial bus; a receive data extraction section for extracting send data sent to the communication control circuit from the send data received via the serial bus; and a response data output section for getting response data corresponding to the send data extracted by the receive data extraction section from the response data holding section and for making a request to send the response data to the communication node from which the send data was sent.

In addition, in order to achieve the above second object, a communication control method for controlling sending data to or receiving data from one or more communication nodes connected via a serial bus in synchronous transfer mode based on unique communication cycles is provided. This communication control method comprises the steps of calculating permissible time for receiving response data corresponding to send data sent to each of the communication nodes from data length of the send data, data length of the response data, and a number of the communication nodes to which the send data is sent on the basis of the communication cycles; and determining whether the response data received as a response to the send data sent via the serial bus is received within the permissible time.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will now be described in detail with reference to the drawings.

Figure 2:
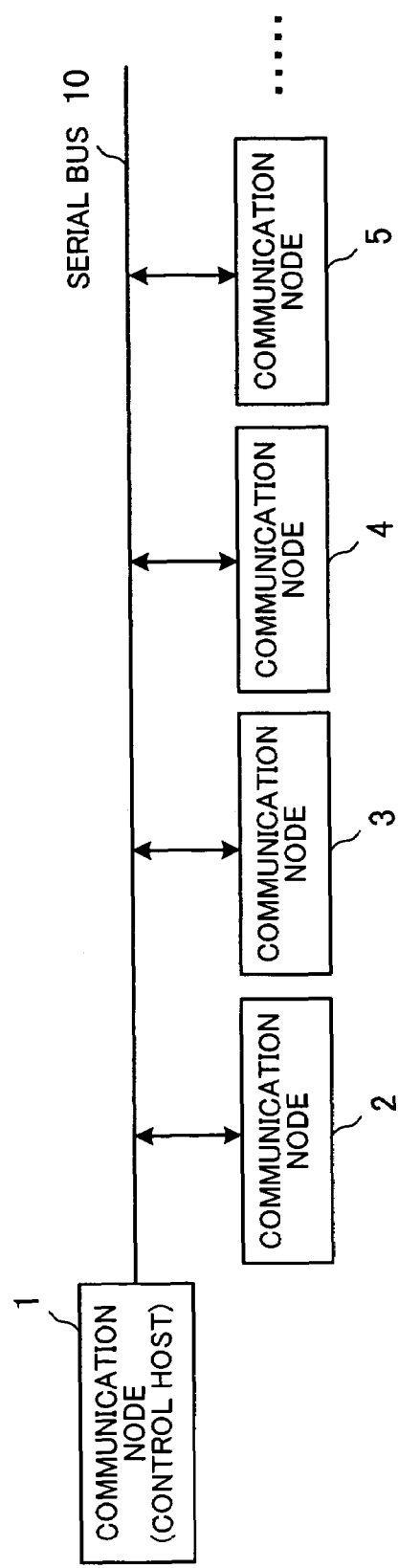
FIG. 2 shows an example of the configuration of a communication system to which the present invention is applied.

FIG. 2 shows an example of the configuration of a communication system to which the present invention is applied.

As shown in FIG. 2, the present invention is applied to a communication system in which communication nodes 1 through 5 are connected to one another via a serial bus 10. Each of the communication nodes 1 through 5 is a computer machine, a household appliance, a manufacturing machine included in an FA system, or the like. In FIG. 2, the case where the five communication nodes are connected to the serial bus 10 is shown as an example. However, the present invention is applicable to a system including two or more communication nodes.

On the serial bus 10, data can be sent or received in synchronous transfer mode based on a unique communication cycle. For example, any communication node is assigned as a management station for synchronous transfer and periodically sends a signal indicative of the beginning of a communication cycle to the serial bus 10. By doing so, synchronous transfer is actualized.

The present invention is applied to the case where a communication node to which data is sent from a second communication node returns a response to the second communication node. By performing such communication in synchronous transfer mode, a data transfer and a response thereto are surely performed in real time. It is assumed that there is a system in which a communication node is a control host and in which the other communication nodes are units to be controlled. In a communication cycle, the control host transfers control data to a plurality of units to be controlled at the same time, checks that it received responses to the control data within predetermined time, and proceeds to the next control. The present invention is applicable to such a system.

Figure 1:
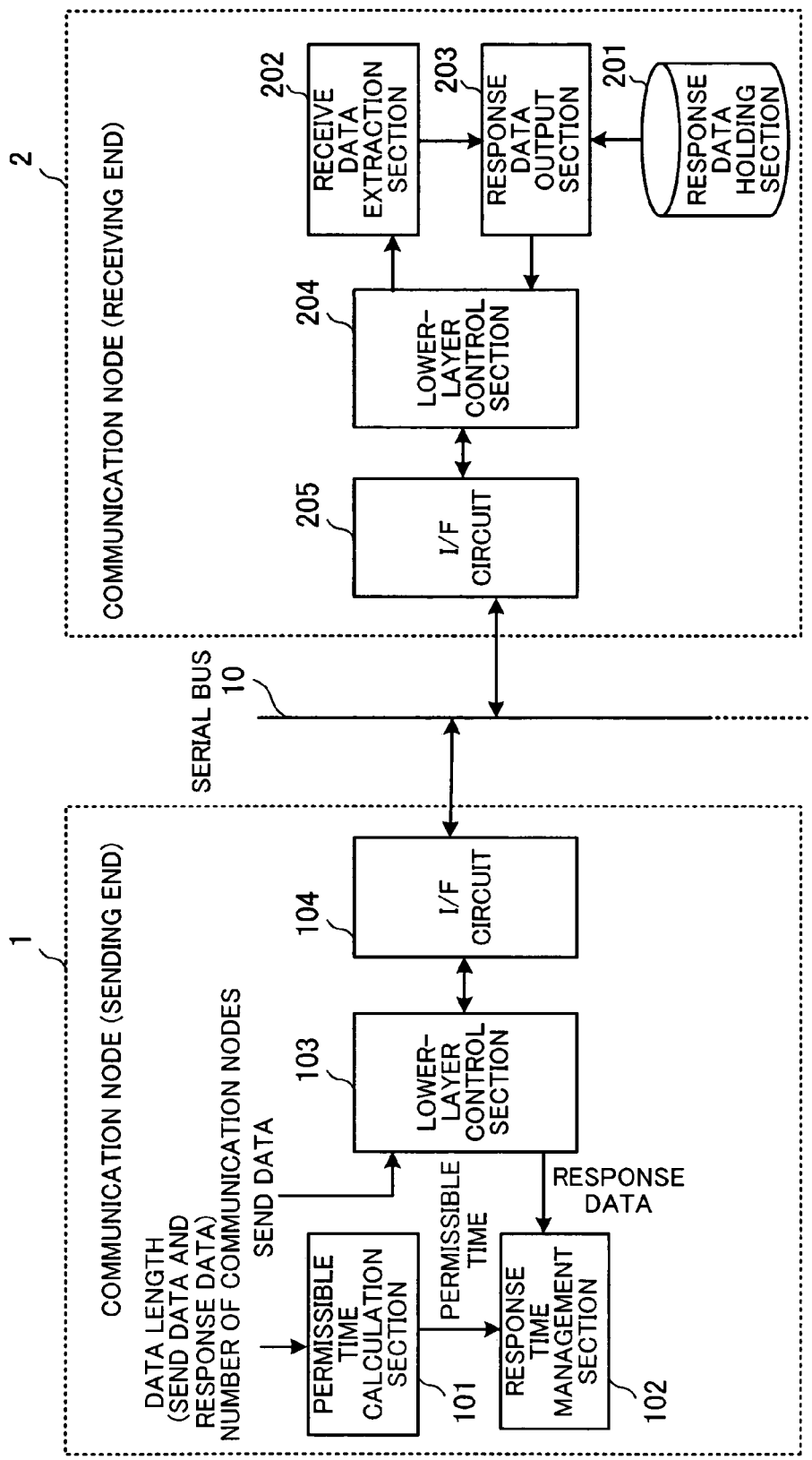
FIG. 1 is a view for describing the principles underlying the present invention.

FIG. 1 is a view for describing the principles underlying the present invention. In FIG. 1, a communication node 1 sends data. Communication nodes 2 through 5 receive this data. The communication node 2 shown in FIG. 1 is representative of them.

As shown in FIG. 1, the communication node 1 at the sending end includes a permissible time calculation section 101, a response time management section 102, a lower-layer control section 103, and an I/F (interface) circuit 104. The communication node 2 at the receiving end includes a response data holding section 201, a receive data extraction section 202, a response data output section 203, a lower-layer control section 204, and an I/F circuit 205.

In the communication node 1, the permissible time calculation section 101, the response time management section 102, the lower-layer control section 103, and the I/F circuit 104 are located in, for example, a communication I/F module which connects with a serial bus 10 for performing communication. Moreover, the permissible time calculation section 101, the response time management section 102, and the lower-layer control section 103 are integrated onto, for example, the same substrate.

The permissible time calculation section 101 calculates permissible time for receiving response data corresponding to send data from the data length of the send data sent to each of the communication nodes 2 through 5 connected to the serial bus 10, the data length of the response data corresponding to the send data, and the number of the communication nodes to which the send data is sent on the basis of a communication cycle specified in synchronous transfer mode.

The response time management section 102 determines whether the response data received as a response to the send data sent via the serial bus 10 is received in the permissible time calculated by the permissible time calculation section 101.

To send the send data to the serial bus 10 and receive the response data from the serial bus 10, the lower-layer control section 103 performs the process of controlling lower layers in network protocols including an electrical interface with the I/F circuit 104, packet sending/receiving, and communication cycles.

The I/F circuit 104 electrically connects with the serial bus 10 and sends a signal outputted from the lower-layer control section 103 to the serial bus 10. In addition, the I/F circuit 104 supplies a signal it received via the serial bus 10 to the lower-layer control section 103.

In the communication node 2, on the other hand, the response data holding section 201, the receive data extraction section 202, the response data output section 203, the lower-layer control section 204, and the I/F circuit 205 are located in, for example, a communication I/F module which connects with the serial bus 10 for performing communication. The response data holding section 201, the receive data extraction section 202, and the response data output section 203 are integrated onto, for example, the same substrate.

Before receiving the data from the communication node 1, the response data holding section 201 holds in advance the response data corresponding to the send data sent. The receive data extraction section 202 extracts the send data sent to the communication node 2 from send data received via the serial bus 10. The response data output section 203 obtains the response data corresponding to the send data extracted by the receive data extraction section 202 from the response data holding section 201 and requests the lower-layer control section 204 to send the response data to the communication node 1 which sent the send data.

The lower-layer control section 204 corresponds to the function of the lower-layer control section 103. To receive the send data from the serial bus 10 and send the response data to the serial bus 10, the lower-layer control section 204 performs the process of controlling the lower layers in the network protocols including an electrical interface with the I/F circuit 205, packet sending/receiving, and communication cycles.

The I/F circuit 205 corresponds to the function of the I/F circuit 104. The I/F circuit 205 electrically connects with the serial bus 10 and sends a signal outputted from the lower-layer control section 204 to the serial bus 10. In addition, the I/F circuit 205 supplies a signal it received via the serial bus 10 to the lower-layer control section 204.

Operation in the communication nodes 1 and 2 will now be described.

For example, in the communication node 1 a request to send predetermined data to each of the communication nodes 2 through 5 is made by an upper-layer application program processing section. In this case, the permissible time calculation section 101 obtains the data length of the send data and the data length of response data corresponding to the send data. These pieces of information should be associated with the send data and be stored in advance in, for example, a record medium.

The permissible time calculation section 101 calculates permissible time for receiving a response from each of the communication nodes 2 through 5 after sending the send data from these data lengths and the number of the communication nodes to which the send data is sent on the basis of a communication cycle specified in synchronous transfer mode. The permissible time calculation section 101 can calculate minimum time necessary for receiving the response data from, for example, time which is taken to send the send data and which depends on the data length of the send data, reconciliation time each of the communication nodes 2 through 5 which received the send data takes to acquire the right to perform data communication on the serial bus 10, and time which each of the communication nodes 2 through 5 takes to send the response data and which depends on the data length of the response data. Accordingly, the permissible time calculation section 101 can take time from sending the send data to the beginning of any communication cycle which appears (for example, the beginning of a communication cycle which appears first) after the elapse of the minimum time as the permissible time.

The send data the sending of which was requested by the upper-layer application program processing section is put into a packet in the lower-layer control section 103, is outputted to the I/F circuit 104, and is sent to the serial bus 10. The response time management section 102 monitors data received via the I/F circuit 104 and the lower-layer control section 103 and counts time taken to receive the response data.

On the other hand, each of the communication nodes 2 through 5 at the receiving end receives the data sent to the serial bus 10. In the communication node 2, the I/F circuit 205 receives the data and passes the data to the lower-layer control section 204. The data is taken from the packet. The receive data extraction section 202 extracts the send data sent to the communication node 2 from the data taken from the packet.

When the send data is extracted, the response data output section 203 obtains response data to be returned corresponding to the extracted send data from the response data holding section 201, outputs the response data to the lower-layer control section 204, and requests the lower-layer control section 204 to send the response data to the communication node 1. As a result, the response data is put into a predetermined packet in the lower-layer control section 204. When the right to send the packet to the serial bus 10 is acquired, the packet is sent to the serial bus 10 via the I/F circuit 205.

In the communication node 1, the I/F circuit 104 receives the response data sent to the serial bus 10. The response time management section 102 obtains the response data received via the lower-layer control section 103. The response time management section 102 determines whether the response data sent from all of the communication nodes 2 through 5 to which the send data was sent is received within the permissible time. If the response data sent from all of the communication nodes 2 through 5 to which the send data was sent is received in the permissible time, then the response time management section 102 informs the upper-layer application program processing section of it and requests the upper-layer application program processing section to output send data to be sent next. If the response data sent from all of the communication nodes 2 through 5 to which the send data was sent is not received within the permissible time, then, for example, the response time management section 102 informs the upper-layer application program processing section that an error occurred.

As a result, the communication node 1 at the sending end can receive the responses to the send data by performing communication in the synchronous transfer mode, and manage time taken to receive the responses on the basis of a communication cycle. Accordingly, the communication node 1 can realize whether the communication nodes at the receiving end received the send data within determined time, and secure a real-time data transfer.

In addition, response time is managed on the basis of a communication cycle, so the above real-time data transfer is actualized by a process at a low layer in the network protocols. As a result, it is possible to implement these processing functions by a control circuit included in a communication I/F module without using an external control circuit. This leads to a decrease in the manufacturing costs or installation area. Moreover, processing overhead is reduced and real-time data transfer can be performed more accurately.

In the communication node 2 at the receiving end, on the other hand, when the send data is received, control is exercised so as to obtain the response data corresponding to the send data from the response data holding section 201 which holds in advance the response data and to return the response data to the communication node 1 which sent the send data. Therefore, by implementing such a function by a control circuit included in a communication I/F module, a high-speed response process in which overhead is reduced can be performed. In this case, there is no need for an external control circuit to perform a process by executing an application at an upper layer. As a result, a real-time data transfer can be secured more easily.

An embodiment of the present invention will now be described concretely on the assumption that the IEEE 1394 is used as a communication I/F standard for the above communication system, that the communication node 1 is a control host, that the communication nodes 2 through 5 are units to be controlled, and that the operation of the communication nodes 2 through 5 is controlled by a control command sent from the communication node 1.

Figure 3:
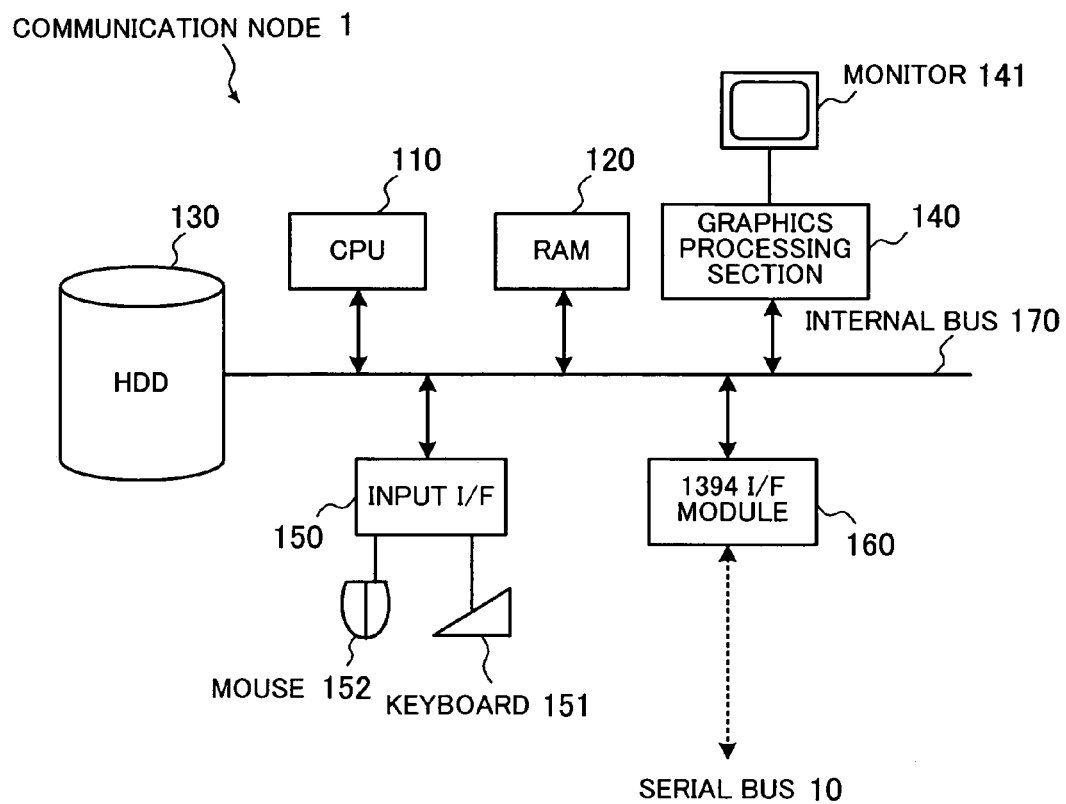
FIG. 3 is a block diagram showing an example of the hardware configuration of a communication node, being a control host.

FIG. 3 is a block diagram showing an example of the hardware configuration of the communication node 1, being a control host.

FIG. 3 shows an example of the configuration of the communication node 1 which is a computer machine such as a personal computer. The communication node 1 includes a central processing unit (CPU) 110, a random access memory (RAM) 120, a hard disk drive (HDD) 130, a graphics processing section 140, an input I/F 150, and a 1394 I/F module 160 which are connected to one another via an internal bus 170.

The CPU 110 executes a program stored in the HDD 130 and controls the operation of the entire communication node 1. The RAM 120 temporarily stores at least part of a program executed by the CPU 110 and various pieces of data which the CPU 110 needs to perform a process with this program.

The HDD 130 stores an operating system (OS), application programs including a program for controlling the operation of the other communication nodes 2 through 5 and a communication control program for exercising control over upper layers in communication protocols for an IEEE 1394 bus (serial bus 10, in this example), and various pieces of data.

A monitor 141 is connected to the graphics processing section 140. In accordance with instructions from the CPU 110, the graphics processing section 140 displays an image on a screen of the monitor 141. A keyboard 151 and a mouse 152 are connected to the input I/F 150. The input I/F 150 sends a signal sent from the keyboard 151 or the mouse 152 to the CPU 110 via the internal bus 170.

The 1394 I/F module 160 is a communication I/F at the sending end of signals for controlling the communication nodes 2 through 5 and sends data to or receives data from the other communication nodes 2 through 5 via the serial bus 10 in accordance with the IEEE 1394 standard.

Figure 4:
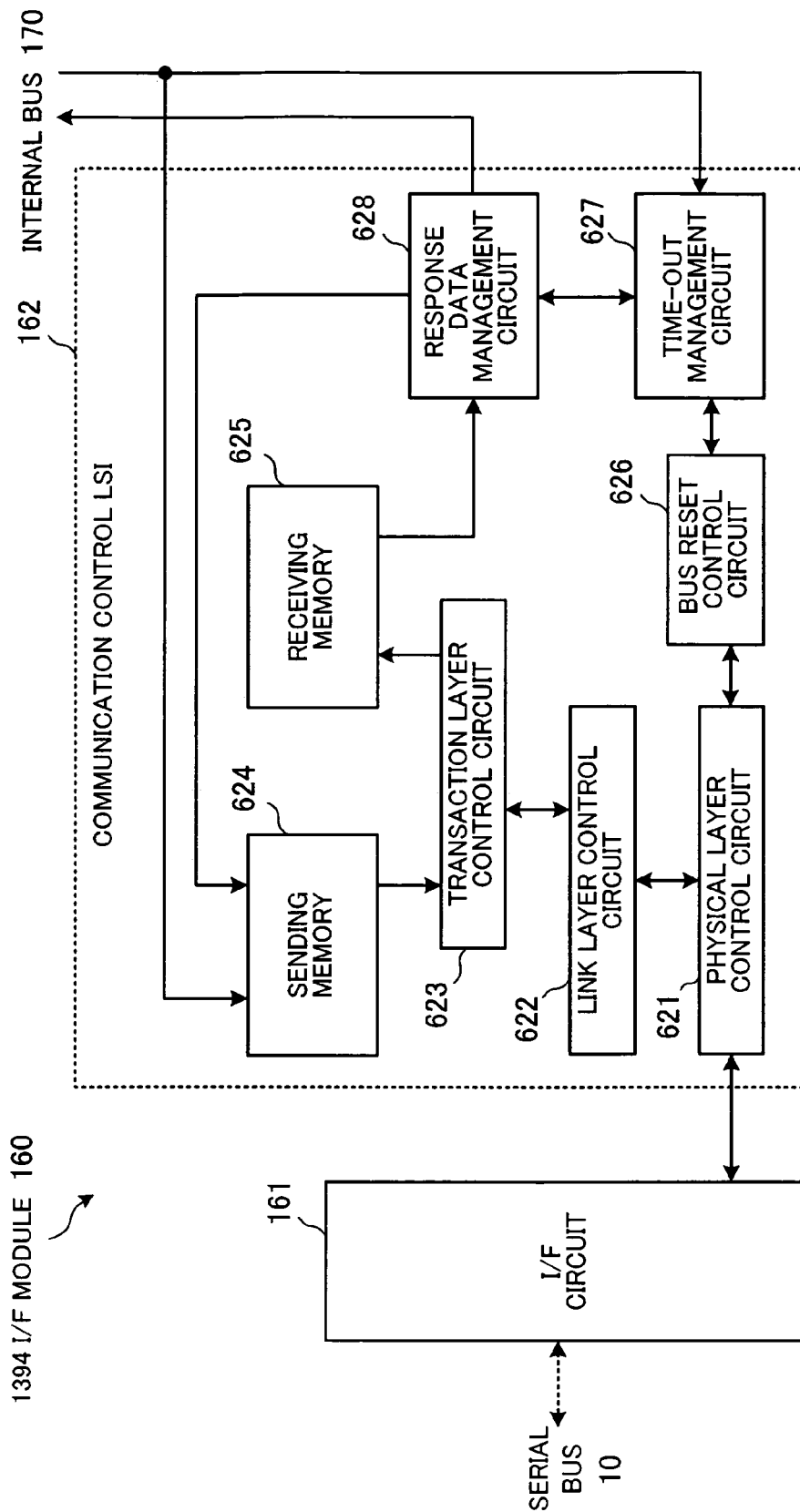
FIG. 4 is a block diagram showing the internal structure of a 1394 I/F module included in the control host.

FIG. 4 is a block diagram showing the internal structure of the 1394 I/F module 160.

As shown in FIG. 4, the 1394 I/F module 160 includes an I/F circuit 161 and a communication control LSI 162. The I/F circuit 161 electrically connects with the serial bus 10 to send or receive a signal. The communication control LSI 162 controls the operation of the I/F circuit 161 in accordance with a process the CPU 110 performs by executing an application program at an upper layer. The communication control LSI 162 includes control circuits for controlling the sending of the control commands to the other communication nodes 2 through 5 and for managing timing with which the response data corresponding to the control commands is received.

The communication control LSI 162 includes a physical layer control circuit 621, a link layer control circuit 622, a transaction layer control circuit 623, a sending memory 624, a receiving memory 625, a bus reset control circuit 626, a time-out management circuit 627, and a response data management circuit 628.

The physical layer control circuit 621 performs the process of converting an electrical signal sent or received via the serial bus 10 to a logical signal used by the link layer control circuit 622 and converting a logical signal used by the link layer control circuit 622 to an electrical signal sent or received via the serial bus 10. To be concrete, for example, the physical layer control circuit 621 encodes and decodes a logical signal used by the link layer control circuit 622, specifies an electrical I/F such as an electrical signal level, arbitrates in the right to use the serial bus 10, controls communication clock resynchronization.

The link layer control circuit 622 performs signal processing between the physical layer control circuit 621 and the transaction layer control circuit 623. To be concrete, the link layer control circuit 622 receives data or a command from the transaction layer control circuit 623, generates a standard packet based on the IEEE 1394 standard, and requests the physical layer control circuit 621 to send the packet. In addition, the link layer control circuit 622 extracts data outputted from the physical layer control circuit 621 from a packet by, for example, checking the data and dividing the data into frames and passes the data to the transaction layer control circuit 623. If the communication node 1 is a root node, the link layer control circuit 622 performs the process of controlling an isochronous cycle.

The transaction layer control circuit 623 performs signal processing between the CPU 110 which executes an application program at an upper layer and the link layer control circuit 622 via the sending memory 624 and the receiving memory 625. For example, the transaction layer control circuit 623 transfers data or a command stored in the sending memory 624 to the link layer control circuit 622 and stores data received from the link layer control circuit 622 in the receiving memory 625.

The sending memory 624 is a first-in first-out (FIFO) data buffer dedicated to sending in isochronous transfer mode. The sending memory 624 receives data or a command generated by the upper-layer application program processing section via the internal bus 170, holds the data or the command, and outputs the data or the command it holds to the transaction layer control circuit 623 in response to, for example, a request from the response data management circuit 628.

The receiving memory 625 is an FIFO data buffer dedicated to receiving in isochronous transfer mode. The receiving memory 625 holds data it receives from the transaction layer control circuit 623 and outputs the data to the response data management circuit 628.

The bus reset control circuit 626 is a circuit for controlling the initialization (bus reset) operation of the serial bus 10. After bus reset is completed, the bus reset control circuit 626 informs the time-out management circuit 627 about the number of connected nodes.

When control commands are sent to the communication nodes 2 through 5, the time-out management circuit 627 sets time (time-out time) after which a time-out occurs at the time of receiving responses to the control commands on the basis of an isochronous cycle and counts time taken to receive the responses. When the time-out management circuit 627 receives a task start request made by the upper-layer application program processing section via the internal bus 170, the time-out management circuit 627 informs the response data management circuit 628 of control commands for performing a task requested and obtains the data length of response data corresponding to the control commands. The time-out management circuit 627 calculates and sets the time-out time according to the data length of the response data, the data length of the control commands sent, and the number of the connected nodes of which the bus reset control circuit 626 informs the time-out management circuit 627. For example, the time-out time may be measured on the basis of a clock signal supplied to the time-out management circuit 627 or be measured by counting isochronous cycles outputted by the link layer control circuit 622.

The response data management circuit 628 informs the time-out management circuit 627 about the data length of the response data corresponding to the control commands sent. In addition, the response data management circuit 628 monitors the response data stored in the receiving memory 625 after that and determines on the basis of information from the time-out management circuit 627 whether the response data was received within the time-out time. If the response data was received normally, then the response data management circuit 628 permits sending a next control command. To be concrete, the response data management circuit 628 informs the upper-layer application program processing section about a determination via the internal bus 170, makes the upper-layer application program processing section store the next control command in the sending memory 624, and requests the sending memory 624 to read out the control command.

Figure 5:
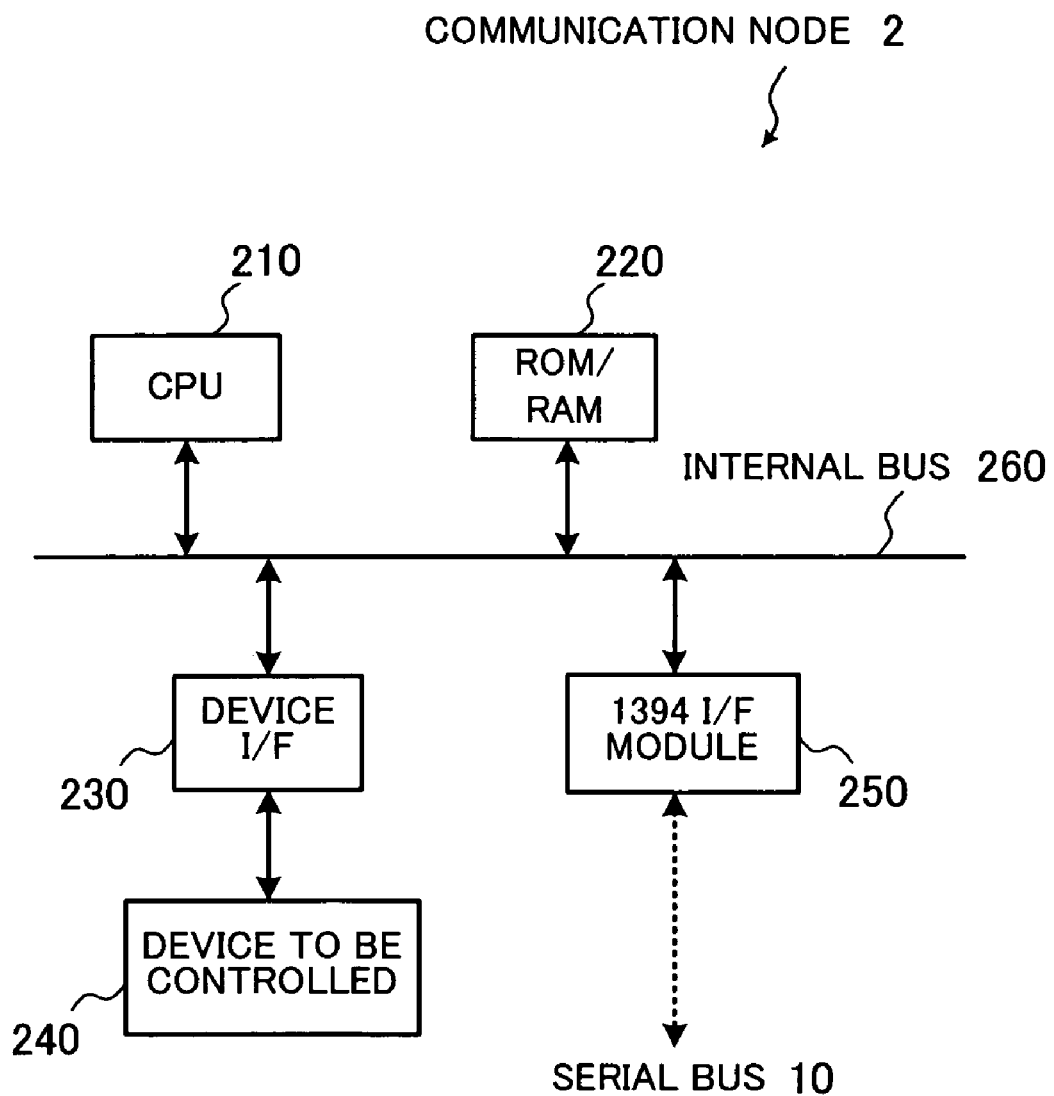
FIG. 5 is a block diagram showing an example of the hardware configuration of a communication node to be controlled.

The configuration of the communication nodes to be controlled by the control host will now be described. FIG. 5 is a block diagram showing an example of the hardware configuration of the communication node 2 that is representative of these communication nodes. The other communication nodes 3 through 5 can be actualized by the same hardware configuration.

The communication node 2 includes a CPU 210, a read only memory (ROM)/RAM 220, a device I/F 230, a device 240 to be controlled, and a 1394 I/F module 250 which are connected to one another via an internal bus 260.

The CPU 210 executes a program stored in the ROM/RAM 220 and controls the operation of the entire communication node 2. The ROM/RAM 220 holds in advance an application program executed by the CPU 210 and data. In addition, the ROM/RAM 220 temporarily stores various pieces of data which the CPU 210 needs to perform a process with this program. Such an application program may be a program for controlling the operation of the device 240 to be controlled in accordance with a control signal sent from the communication node 1 which is a control host, a communication control program for exercising control over upper layers in the communication protocols for an IEEE 1394 bus (serial bus 10, in this example), or the like.

The device 240 to be controlled is a device the operation of which is to be controlled by the communication node 1 which is a control host. If this system is applied to, for example, an FA system, then the device 240 to be controlled is a manufacturing machine for manufacturing products or part of it.

The 1394 I/F module 250 is a communication I/F at the receiving end of a control signal sent from the communication node 1. The 1394 I/F module 250 sends data to or receives data from the other communication nodes 1 and 3 through 5 via the serial bus 10 in accordance with the IEEE 1394 standard.

Figure 6:
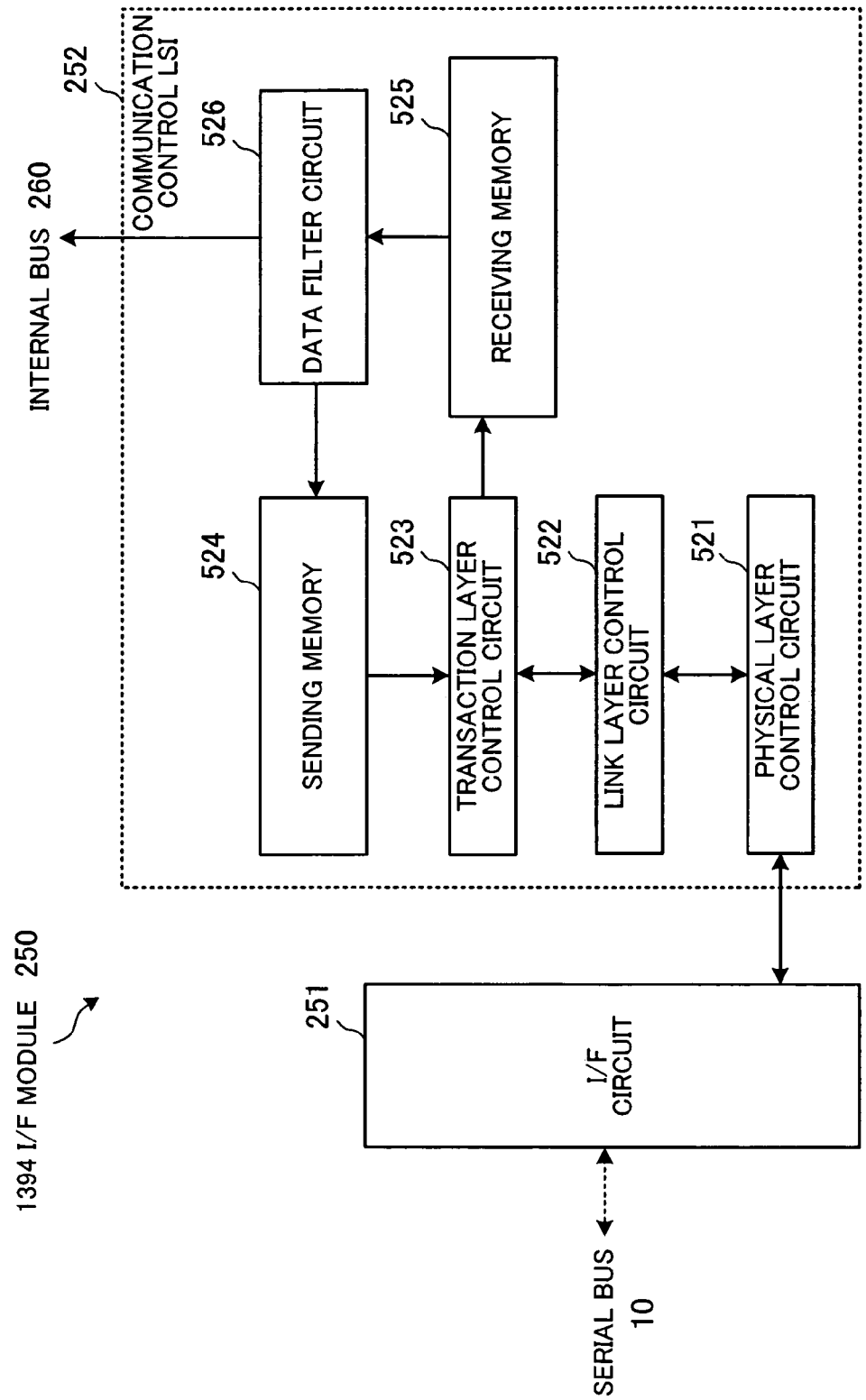
FIG. 6 is a block diagram showing the internal structure of a 1394 I/F module included in the communication node to be controlled.

FIG. 6 is a block diagram showing the internal structure of the 1394 I/F module 250.

As shown in FIG. 6, the 1394 I/F module 250 includes an I/F circuit 251 and a communication control LSI 252. The I/F circuit 251 electrically connects with the serial bus 10 to send or receive a signal. The communication control LSI 252 controls the operation of the I/F circuit 251 in accordance with a process the CPU 210 performs by executing an application program at an upper layer. The communication control LSI 252 includes a control circuit for controlling the sending of the response data corresponding to the control command the communication node 2 received from the communication node 1.

The communication control LSI 252 includes a physical layer control circuit 521, a link layer control circuit 522, a transaction layer control circuit 523, a sending memory 524, a receiving memory 525, and a data filter circuit 526.

The functions of the physical layer control circuit 521, the link layer control circuit 522, and the transaction layer control circuit 523 are the same as those of the physical layer control circuit 621, the link layer control circuit 622, and the transaction layer control circuit 623, respectively, included in the communication node 1.

That is to say, the physical layer control circuit 521 performs the process of converting an electrical signal sent or received via the serial bus 10 to a logical signal used by the link layer control circuit 522 and converting a logical signal used by the link layer control circuit 522 to an electrical signal sent or received via the serial bus 10. The link layer control circuit 522 performs the process of, for example, controlling packet sending/receiving between the physical layer control circuit 521 and the transaction layer control circuit 523. The transaction layer control circuit 523 performs signal processing between the CPU 210 which executes an application program at an upper layer and the link layer control circuit 522 via the sending memory 524 and the receiving memory 525.

The sending memory 524 is a memory dedicated to sending in isochronous transfer mode. The sending memory 524 holds in advance the response data corresponding to the control command sent from the communication node 1, and outputs the corresponding response data to the transaction layer control circuit 523 in response to a request from the data filter circuit 526.

The receiving memory 525 is an FIFO data buffer dedicated to receiving in isochronous transfer mode. The receiving memory 525 temporarily holds data sent from the transaction layer control circuit 523 and outputs the data to the data filter circuit 526.

The data filter circuit 526 extracts a control command sent to the communication node 2 from the control commands received from the communication node 1 and stored in the receiving memory 525, informs the upper-layer application program processing section about the control command via the internal bus 260, and requests the sending memory 524 to send response data corresponding to the control command.

Figure 7:
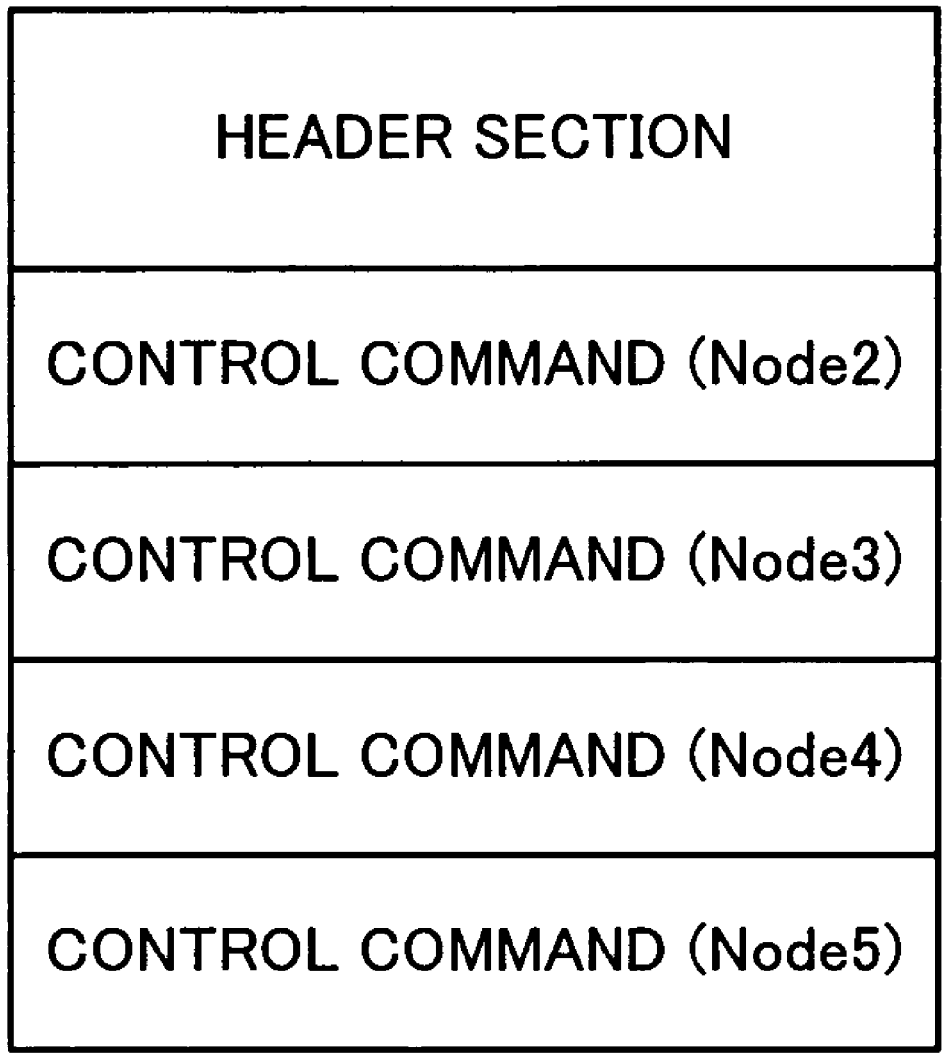
FIG. 7 shows an example of the structure of a packet used when a control command is sent from the communication node, being a control host.

A control command sent from the communication node 1, being a control host, will now be described. FIG. 7 shows an example of the structure of a packet used when a control command is sent from the communication node 1.

In the communication node 1, a request to send a control command to each of the communication nodes 2 through 5 to be controlled is made as a result of a process the CPU 110 performs by executing an application program. In this case, the operation of a plurality of communication nodes synchronized with the same timing is controlled as one task. That is to say, when a request to start one task is made, control commands corresponding to one or more communication nodes to be controlled in this task are sent at a time. On the serial bus 10, control commands are sent to the communication nodes 2 through 5 in synchronization with an isochronous cycle according to tasks.

FIG. 7 shows an example of a data packet sent when a request to start one task is made. This data packet is generated in the link layer control circuit 622 as an isochronous packet based on the IEEE 1394 standard. This data packet includes a header section at its head in which a channel or the like indicative of a communication node where the data packet is to be sent is specified. In this example, "3F" is specified in the header section as a destination channel number so that all of the communication nodes connected will be specified. As a result, the data packet shown in FIG. 7 is broadcast to the serial bus 10.

After the above header section, control commands to be sent to the communication nodes connected are stored in order. An original control command is sent to each communication node, so a communication node to be controlled is specified only by a control command.

When bus reset is performed, the communication node 1 can recognize the number of the communication nodes connected by the bus reset control circuit 626. The number of control command storage areas set after the header section corresponds to that of the nodes connected. If there is a control command to be sent to each communication node in each task, then the control command is stored in a corresponding area. Accordingly, data other than, for example, synchronization data indicative of the head of each area is not stored in an area corresponding to a communication node to which there is no control command to be sent.

By adopting such a simple data packet structure, the data length of a data packet sent to each communication node can be suppressed and a receiving process at the receiving end can be simplified. In addition, if the data length of a control command sent to each communication node is known, the data length of the data packet sent can be calculated.

On the other hand, data packets are sent from the communication nodes 2 through 5 at the receiving end as responses by using different channels. Each of these data packets includes a header section where, for example, information for specifying the communication node 1 as a destination is stored and a data area where response data is stored. This is the same with the above data packet. Therefore, if the data length of the response data is known, the data length of each data packet returned can be calculated.

The calculation of time-out time in the communication node 1 will now be described.

As stated above, when control commands are sent from the communication node 1, the time-out management circuit 627 calculates time-out time and counts time taken to receive responses. The time-out time is calculated according to the data length of the control commands sent, the data length of response data corresponding to the control commands, and the number of nodes connected on the basis of an isochronous cycle.

Figure 8:
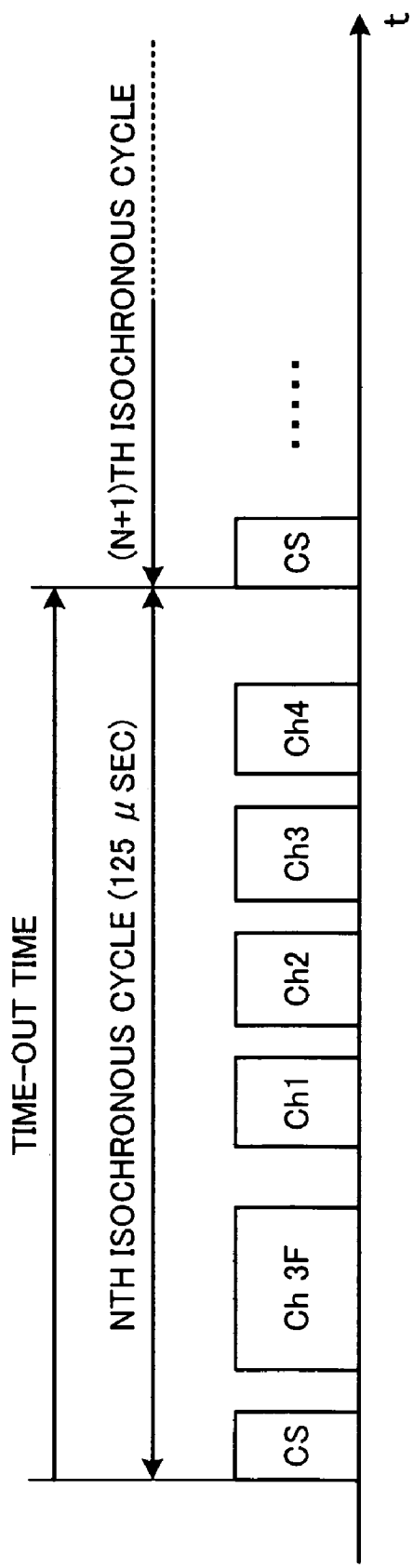
FIG. 8 shows timing with which data is sent or received on a serial bus in the case where time-out time is set to a value corresponding to one isochronous cycle.

FIG. 8 shows timing with which data is sent or received on the serial bus 10 in the case where the time-out time is set to a value corresponding to one isochronous cycle.

In isochronous transfer mode, each 125-microsecond isochronous cycle begins with a cycle start signal (CS) sent from a root node. After the cycle start signal is sent, the communication node 1 first broadcasts a data packet in which control commands corresponding to a task requested are stored.

A communication node at the receiving end extracts a control command sent thereto from the data packets it received, and transfers the data packets to another communication node. As a result, the data packets sent from the communication node 1 are received by all of the communication nodes 2 through 5 connected. The communication nodes which extracted control commands sent thereto perform the process of acquiring the right to use the serial bus 10, and return response data by using different channels. After transfer by one communication node is completed, another communication node that acquires the right to use the serial bus 10 returns response data.

Time taken to perform such data transfer can be calculated from a transfer rate specified on the serial bus 10, the data length of a data packet sent from the communication node 1, and the data length of a data packet returned as a response. Processing time from the sending of a cycle start signal to the sending of data by the communication node 1 and processing time each communication node at the receiving end takes to acquire the right to use the serial bus 10 are approximately constant. Accordingly, the time-out management circuit 627 in the communication node 1 can estimate time taken to receive response data from all communication nodes to which control commands are sent at the time of a request to start one task being made by considering the above time, and calculate time-out time from the estimated time. That is to say, the time-out management circuit 627 can calculate time-out time from the number of the nodes connected, the data length of each control command sent to make the request to start one task, and the data length of response data corresponding to each control command.

Figure 9:
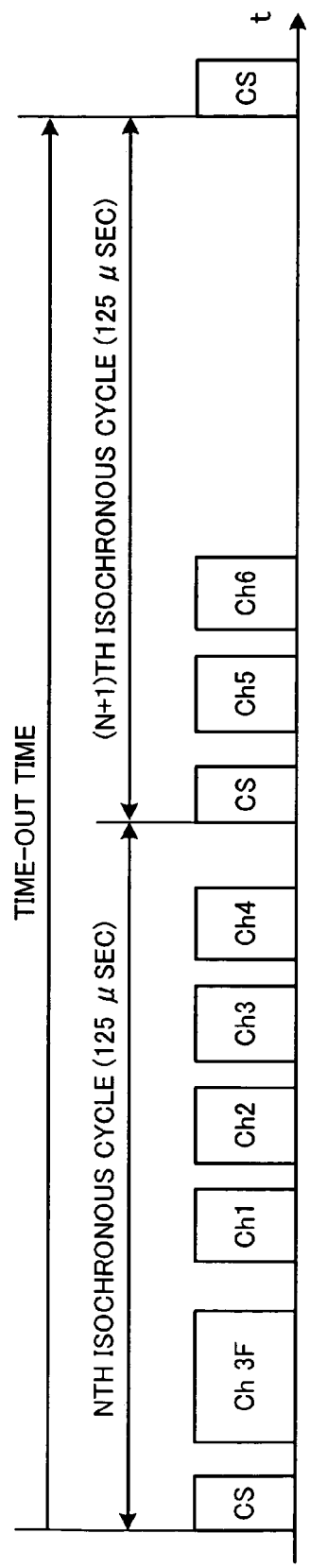
FIG. 9 shows timing with which data is sent or received on a serial bus in the case where time-out time is set to a value corresponding to two isochronous cycles.

FIG. 9 shows timing with which data is sent or received on the serial bus 10 in the case where time-out time is set to a value corresponding to two isochronous cycles.

If time taken to receive response data from all communication nodes to which control commands are sent at the time of a request to start one task being made is shorter than or equal to, for example, one isochronous cycle, then, as shown in FIG. 8, the time-out management circuit 627 should set time from the sending of a cycle start signal to the outputting of the next cycle start signal as time-out time. If time taken to receive response data from all communication nodes to which control commands are sent at the time of a request to start one task being made is longer than one isochronous cycle, then, as shown in FIG. 9, the time-out management circuit 627 should set time corresponding to, for example, more than one isochronous cycle as time-out time. In the example shown in FIG. 9, the number of connected communication nodes at the receiving end is six. By setting the time-out time in this way, whether the response data is received can be checked in synchronization with a data transfer cycle specified in isochronous transfer mode. This guarantees real-time control.

Figure 10:
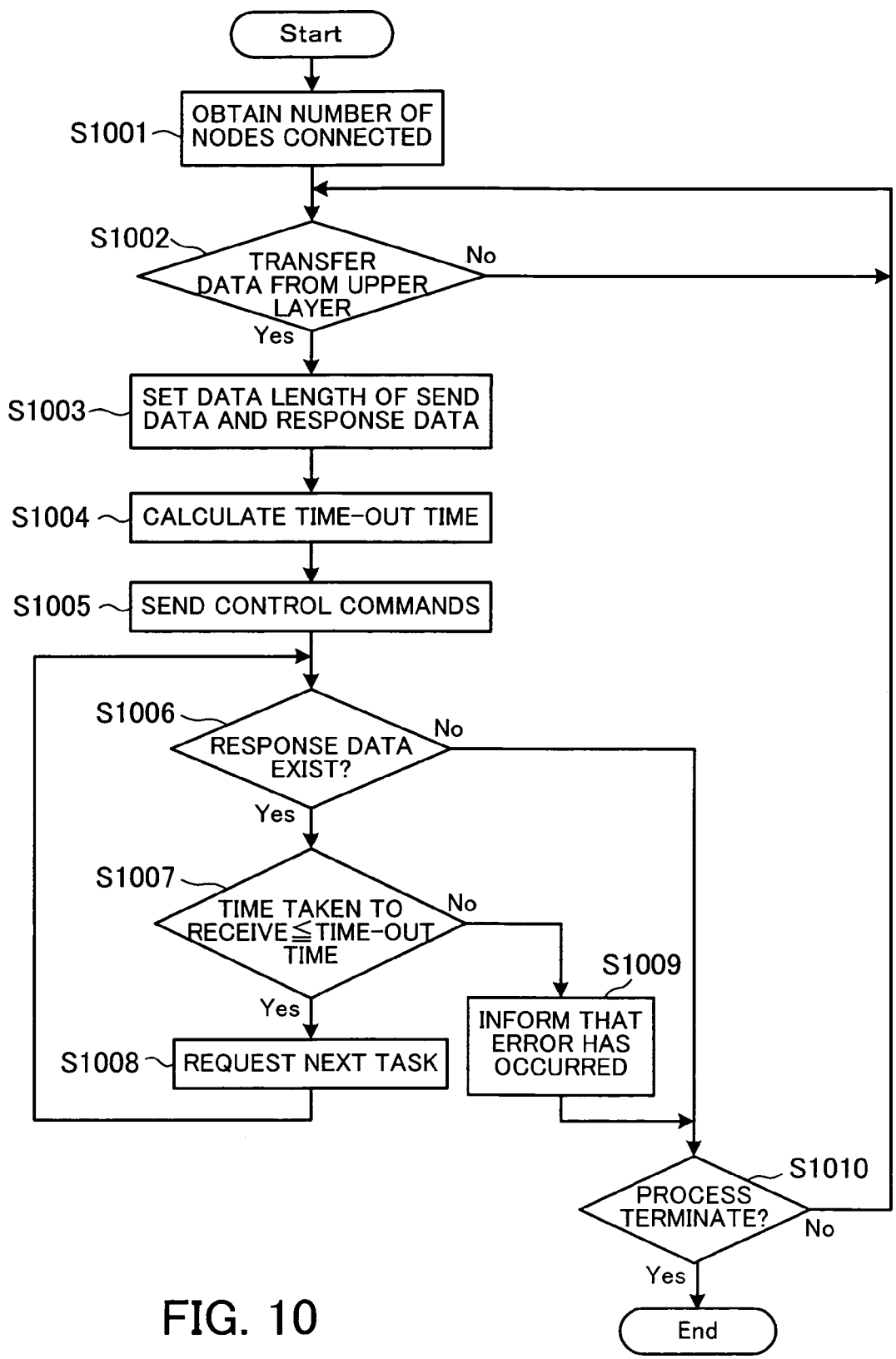
FIG. 10 is a flow chart showing the flow of a process performed in the communication node, being a control host, at the time of sending control commands.

FIG. 10 is a flow chart showing the flow of a process performed in the communication node 1 at the time of sending control commands.

In step S1001, at bus reset processing time the bus reset control circuit 626 informs the time-out management circuit 627 of the number of the nodes connected.

In step S1002, the time-out management circuit 627 waits for data which is transferred from the upper-layer application program processing section and by which a request to start a task is made. When data is transferred from the upper-layer application program processing section, step S1003 is performed. At this time control commands corresponding to the task the start of which is requested are stored in the sending memory 624.

In step S1003, the time-out management circuit 627 sets the data length of the control commands corresponding to the task. In addition, the time-out management circuit 627 inquires of the response data management circuit 628 the data length of response data corresponding to each control command and obtains and sets this data length.

In step S1004, the time-out management circuit 627 calculates time-out time from the data length of the control commands sent, the data length of the response data sent, and the number of the nodes connected.

In step S1005, the control commands are read out from the sending memory 624 and are outputted to the I/F circuit 161 via the transaction layer control circuit 623, the link layer control circuit 622, and the physical layer control circuit 621. A data packet in which the control commands are stored is sent to the serial bus 10. At this time the time-out management circuit 627 begins to measure time.

In step S1006, response data is received from the communication nodes to which the control commands were sent, and is stored in the receiving memory 625 via the physical layer control circuit 621, the link layer control circuit 622, and the transaction layer control circuit 623. If the response data management circuit 628 determines that the data stored in the receiving memory 625 is response data corresponding to the sent request to start a task, then step S1007 is performed. If there is no response data in the receiving memory 625, then step S1010 is performed.

In step S1007, the response data management circuit 628 informs the time-out management circuit 627 that the response data read out from the receiving memory 625 was received, and inquires of the time-out management circuit 627 whether the response data was received within the time-out time. If the response data was received within the time-out time, then step S1008 is performed. If the response data was received after the elapse of the time-out time, then step S1009 is performed.

In step S1008, the response data management circuit 628 requests the upper-layer application program processing section via the internal bus 170 to transfer data by which instructions to start the next task are given. The response data management circuit 628 then reverts to step S1006, monitors the receiving memory 625, and waits for response data to be received next. Therefore, steps S1006 through S1008 are repeated until response data returned from all of the communication nodes to which the control commands were sent is received.

If the response data was received after the elapse of the time-out time in step S1007, then in step S1009 the response data management circuit 628 informs the upper-layer application program processing section via the internal bus 170 that an error has occurred, and proceeds to step S1010.

In step S1010, the response data management circuit 628 determines whether the upper-layer application program processing section informs the response data management circuit 628 that the process terminates. If the upper-layer application program processing section does not inform the response data management circuit 628 that the process terminates, then step S1002 is performed again. If the upper-layer application program processing section informs the response data management circuit 628 that the process terminates, then the response data management circuit 628 terminates the process.

Figure 11:
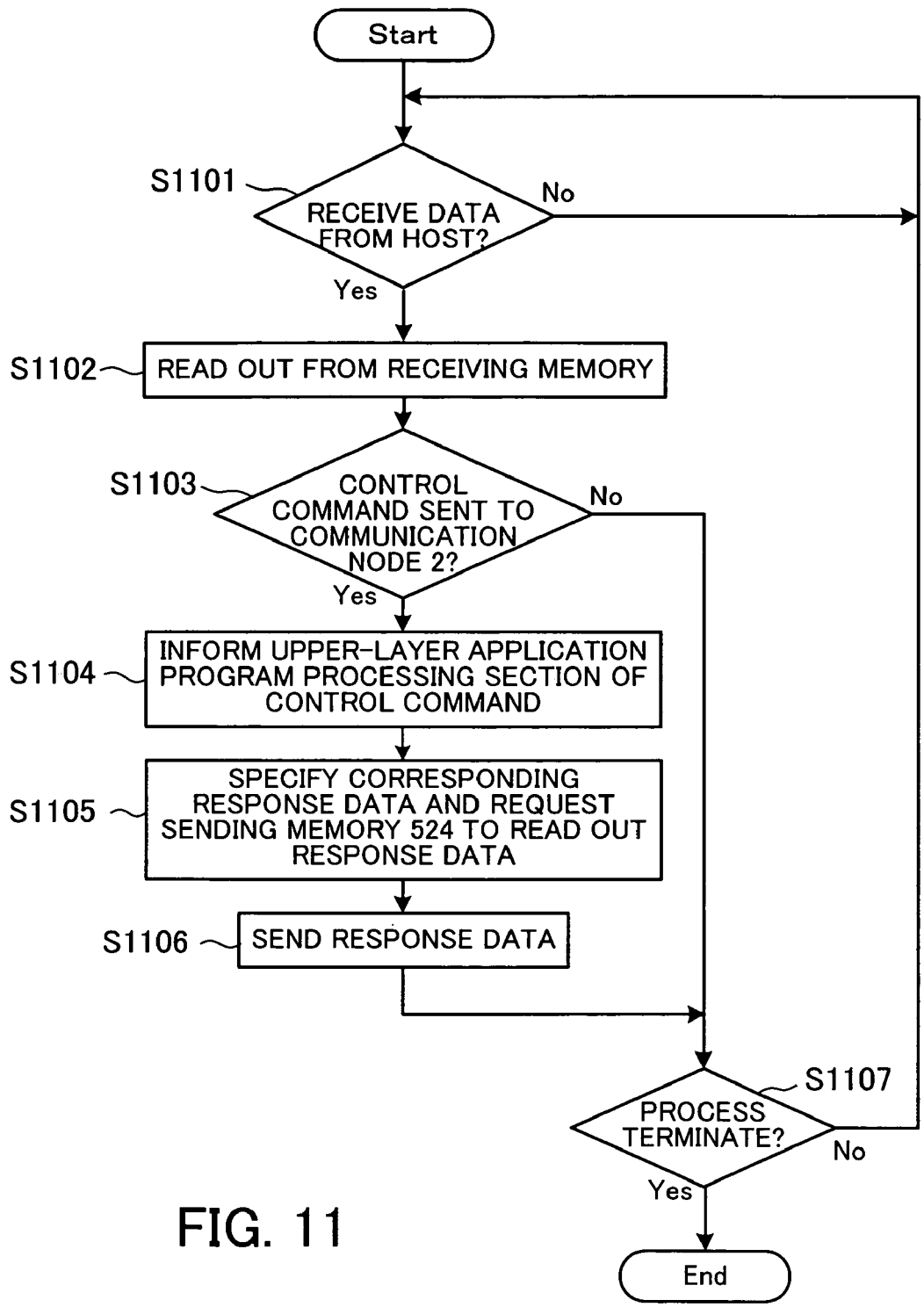
FIG. 11 is a flow chart showing the flow of a process performed in a communication node at the receiving end at the time of receiving a control command.

FIG. 11 is a flow chart showing the flow of a process performed in the communication node 2 representative of the communication nodes which receive the control commands at the time of receiving a control command.

In step S1101, the communication node 2 waits for the data packet to be received from the control host (communication node 1). When the communication node 2 receives the data packet, step S1102 is performed. The data packet received is processed by the physical layer control circuit 521, the link layer control circuit 522, and the transaction layer control circuit 523. The control command and the data extracted are stored in order in the receiving memory 525.

In step S1102, the data filter circuit 526 reads out a piece of data received from the receiving memory 525.

In step S1103, if the piece of data the data filter circuit 526 read out from the receiving memory 525 is the control command sent to the communication node 2, then step S1104 is performed. If the piece of data the data filter circuit 526 read out from the receiving memory 525 is not the control command sent to the communication node 2, then step S1107 is performed. The data packet the communication node 2 received is a broadcast packet, so the communication node 2 transfers it to another communication node.

In step s1104, the data filter circuit 526 informs the upper-layer application program processing section via the internal bus 260 that the control command sent to the communication node 2 was received.

In step S1105, the data filter circuit 526 informs the sending memory 524 of an address where response data corresponding to the control command received is stored, and requests the sending memory 524 to read out the response data.

In step S1106, the response data specified is read out from the sending memory 524, is processed by the transaction layer control circuit 523, the link layer control circuit 522, and the physical layer control circuit 521, is supplied to the I/F circuit 251, and is sent to the communication node 1 via the serial bus 10. Step S1107 is then performed. When the physical layer control circuit 521 is requested to send a data packet generated by the link layer control circuit 522, the physical layer control circuit 521 requests the root node (communication node 1, for example) to give the physical layer control circuit 521 the right to use the serial bus 10. When the physical layer control circuit 521 acquires the right to use the serial bus 10, the physical layer control circuit 521 sends the data packet via the I/F circuit 251. As a result, response data from the communication nodes which received the control commands are sent in order to the communication node 1 via the serial bus 10.

In step S1107, if instructions to terminate the process are given by the upper-layer application program processing section, then the process terminates. If instructions to terminate the process are not given by the upper-layer application program processing section, then the process returns to step S1101 and the communication node 2 waits for the next data packet to be received from the communication node 1.

As stated above, circuits such as the communication control LSIs 162 and 252 are included in the 1394 I/F modules in the communication node, being a control host, and the communication node to be controlled, respectively. Accordingly, a system in which instructions to start a task and a response thereto are periodically completed can be built. In this case, there is no need for the CPU to perform a process by executing an application program at an upper layer.

The communication control LSI included in the control host can recognize the data length of control commands sent and the data length of response data corresponding to the control commands. This makes it possible to calculate time-out time for receiving response data corresponding to each control command sent and to manage receiving time on the basis of an isochronous cycle. Therefore, real-time control can easily be secured. Moreover, an isochronous cycle is controlled at the link layer level. As a result, the management of the receiving time on the basis of this cycle is performed as a process at a lower layer regardless of a process performed by the external CPU. This reduces overhead and enables high-speed processing.

In addition, the operation of a plurality of communication nodes is included in one task and control commands are broadcast to these communication nodes. By doing so, the operation of sending instructions to start a task to the plurality of communication nodes and the operation of receiving responses from the plurality of communication nodes each of which needs synchronization operation can be finished within a specific period of time.

In the communication node to be controlled, on the other hand, the communication control LSI holds in advance the response data corresponding to the control command. As a result, when the communication node to be controlled receives the control command, the communication node to be controlled can return the response data within a short period of time. In this case, overhead caused by a process performed by the external CPU does not exist. Therefore, real-time control can be secured more reliably.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication control circuit for controlling sending data to or receiving data from one or more communication nodes connected via a serial bus in synchronous transfer mode based on unique communication cycles, the circuit comprising:

a permissible time setting section for setting permissible time for receiving response data corresponding to send data sent to each of the communication nodes; and a response time management section for determining whether the response data received as a response to the send data sent via the serial bus is received within the permissible time calculated by the permissible time calculation section, wherein the permissible time setting section calculates minimum time taken to receive the response data from all the communication nodes on the basis of data length of the send data, data length of the response data, and a number of the communication nodes to which the send data is sent, and sets the permissible time to a value corresponding to one or more communication cycles including the minimum time.

2. The communication control circuit according to claim 1, further comprising a lower-layer control section for performing the process of controlling lower layers in network protocols including an electrical interface, packet sending/receiving, and the communication cycles to send the send data to the serial bus and receive the response data from the serial bus, wherein the permissible time calculation section, the response time management section, and the lower-layer control section are integrated onto a same substrate.

3. The communication control circuit according to claim 2, wherein the lower-layer control section exercises control so as to generate a send packet in which the send data to be sent to each of the communication nodes connected to the serial bus is stored in order after a predetermined header and to broadcast the send packet onto the serial bus.

4. The communication control circuit according to claim 1, the send data is control data for controlling operation of each of the communication nodes.

5. A communication control circuit for controlling sending data to or receiving data from one or more communication nodes connected via a serial bus in synchronous transfer mode based on unique communication cycles, the circuit comprising:

a response data holding section for holding in advance response data corresponding to send data sent from a predetermined communication node on the serial bus;

a receive data extraction section for extracting send data sent to the communication control circuit from the send data received via the serial bus;

a response data output section for getting response data corresponding to the send data extracted by the receive data extraction section from the response data holding section and for making a request to send the response data to the communication node from which the send data was sent; and a lower-layer control section for performing the process of controlling lower layers in network protocols including an electrical interface, packet sending/receiving, and the communication cycles to receive the send data from the serial bus and send the response data to the serial bus, wherein the response data holding section, the receive data extraction section, the response data output section, and the lower-layer control section are integrated onto a same substrate.

6. A communication control method for controlling sending data to or receiving data from one or more communication nodes connected via a serial bus in synchronous transfer mode based on unique communication cycles, the method comprising the steps of:

setting permissible time for receiving response data corresponding to send data sent to each of the communication nodes; and determining whether the response data received as a response to the send data sent via the serial bus is received within the permissible time, wherein the permissible time setting section calculates minimum time taken to receive the response data from all the communication nodes on the basis of data length of the send data, data length of the response data, and a number of the communication nodes to which the send data is sent, and sets the permissible time to a value corresponding to one or more communication cycles including the minimum time.

* * * * *